United States Patent
Zhang et al.

(10) Patent No.: US 10,634,930 B2
(45) Date of Patent: Apr. 28, 2020

(54) USE OF AERIAL IMAGING ELEMENT IN TELEPROMPTER AND TELEPROMPTER

(71) Applicant: Feixiang Technology Co., Ltd., Hangzhou, Zhejiang (CN)

(72) Inventors: Bing Zhang, Zhejiang (CN); Chunyi Song, Zhejiang (CN); Lin Shan, Zhejiang (CN); Kan Wang, Zhejiang (CN)

(73) Assignee: Feixiang Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/203,566

(22) Filed: Nov. 28, 2018

(65) Prior Publication Data
US 2019/0094563 A1 Mar. 28, 2019

Related U.S. Application Data

(63) Continuation of application No. PCT/CN2017/086852, filed on Jun. 1, 2017.

(30) Foreign Application Priority Data

Jun. 1, 2016 (CN) .......................... 2016 1 0381760

(51) Int. Cl.
*G03B 21/28* (2006.01)
*G02B 30/56* (2020.01)
(Continued)

(52) U.S. Cl.
CPC .............. *G02B 30/56* (2020.01); *G02B 5/122* (2013.01); *G02B 5/124* (2013.01); *G02B 5/128* (2013.01);
(Continued)

(58) Field of Classification Search
CPC ........ G03B 21/10; G03B 21/28; G03B 21/58; H04N 7/15; H04N 7/18; H04N 7/24;
(Continued)

(56) References Cited

U.S. PATENT DOCUMENTS 6,834,968 B2 * 12/2004 Peatross ................. G03B 21/10
353/122
9,615,054 B1 * 4/2017 McNelley .............. H04N 7/144
(Continued)

FOREIGN PATENT DOCUMENTS

CN 1338058 A 2/2002
CN 101405627 A 4/2009
(Continued)

OTHER PUBLICATIONS

International Search Report of PCT Patent Application No. PCT/CN2017/086852 dated Jul. 27, 2017.

*Primary Examiner* — Sultan Chowdhury (57) ABSTRACT

An aerial imaging element in a teleprompter system, a teleprompter and a teleprompter device includes one or more optical elements that bend incident light of an image and form a real image in the air, and further includes one or more translucent reflectors. The aerial imaging element is convenient to manufacture and is low in cost; the aerial imaging element enables an image displayed therein to form a real image in the air, which can be seen only at a certain angle. The aerial imaging element is applied to the prompt of aspects, such as news broadcasting and lecture giving, which is convenient and does not influence viewing or video recording at the scene.

17 Claims, 5 Drawing Sheets

(51) Int. Cl.
  *G02B 5/128* (2006.01)
  *H04N 5/222* (2006.01)
  *G02B 5/124* (2006.01)
  *G03B 21/10* (2006.01)
  *G02B 5/122* (2006.01)
  *G06F 3/01* (2006.01)
  *G06K 9/00* (2006.01)

(52) U.S. Cl.
  CPC ............ *G03B 21/10* (2013.01); *G03B 21/28* (2013.01); *G06F 3/017* (2013.01); *G06K 9/00355* (2013.01); *H04N 5/2222* (2013.01)

(58) Field of Classification Search
  CPC .... H04N 7/144; H04N 7/0885; H04N 13/302; H04N 13/305; H04N 13/317; H04N 13/356; H04N 13/363; H04N 13/398
  See application file for complete search history.

(56) References Cited

U.S. PATENT DOCUMENTS

2014/0218615 A1* 8/2014 Williams, IV ........... H04N 5/28
  348/722

2015/0328351 A1* 11/2015 Bommarito ............ G01N 21/55
  356/338
2016/0018573 A1* 1/2016 Juni ....................... G02B 5/136
  359/851
2016/0219260 A1* 7/2016 Sato ..................... H04N 13/302
2017/0227929 A1* 8/2017 Suginohara ............ G02B 30/40

FOREIGN PATENT DOCUMENTS

| CN | 101410733 A | 4/2009 |
| CN | 201465500 U | 5/2010 |
| CN | 102298885 A | 12/2011 |
| CN | 102692660 A | 9/2012 |
| CN | 202907041 U | 4/2013 |
| CN | 104038715 A | 9/2014 |
| CN | 104718468 A | 6/2015 |
| CN | 205749964 U | 11/2016 |
| CN | 106560732 A | 4/2017 |
| CN | 106560733 A | 4/2017 |
| CN | 206161885 U | 5/2017 |
| CN | 206161886 U | 5/2017 |
| JP | 2015062076 A | 4/2015 |

* cited by examiner

USE OF AERIAL IMAGING ELEMENT IN TELEPROMPTER AND TELEPROMPTER

CROSS-REFERENCE OF RELATED APPLICATIONS

The present application is a Continuation Application of PCT patent application no. PCT/CN2017/086852 filed on Jun. 1, 2017, which claims the priority of Chinese patent application no. 201610381760.0 filed on Jun. 1, 2016. All the above are hereby incorporated by reference.

FIELD

The present application relates to the field of optical imaging, in particular to use of an aerial imaging element in a teleprompter system and to a teleprompter.

BACKGROUND

Figure 1:
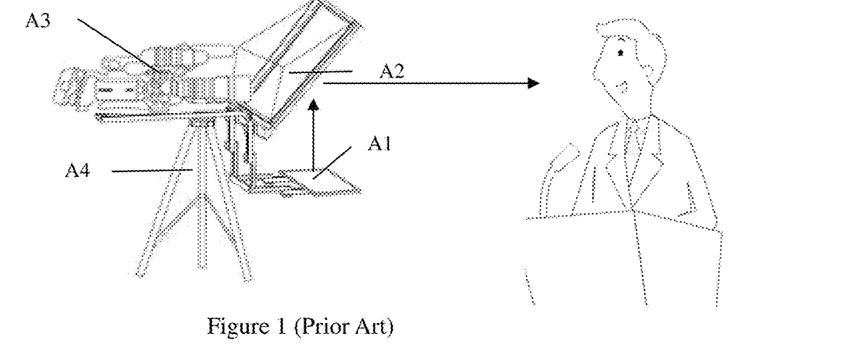
FIG. 1 is a schematic diagram of use of a teleprompter in the prior art.
Figure 2:
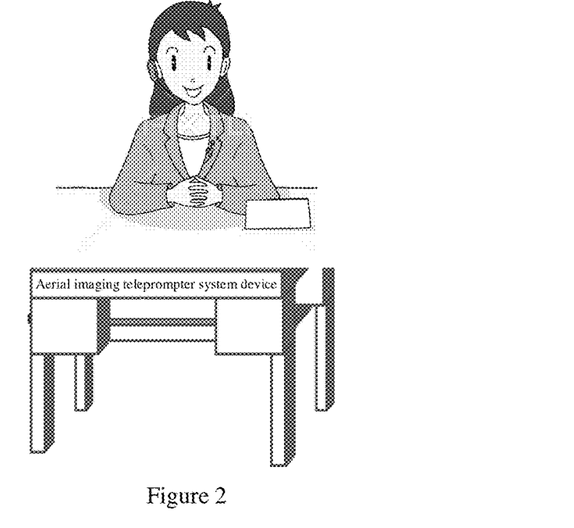
FIG. 2 is a schematic diagram of use of Example 1 of the present application in a news broadcast, wherein R is a real image.
Figure 3:
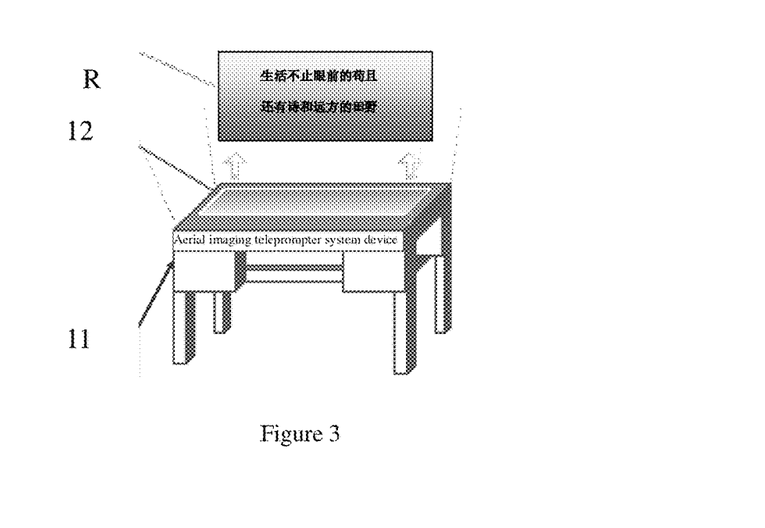
FIG. 3 is a schematic operation diagram of the teleprompter of FIG. 2.

A common teleprompter includes important components such as a monitor A1, a beam splitter A2, its teleprompter host (computer), its control software, and communication cables. As shown in FIG. 1, when using a teleprompter in a TV station, the teleprompter is installed together with a camera A3 on a tripod head A4. The teleprompter is located in front of the camera, and the camera A3 is disposed behind a hood of the teleprompter. When in use, the teleprompter can prompt and the camera can complete shooting normally. The beam splitter of the teleprompter is a transparent glass plate, so it does not affect the shooting of the camera. The working principle of the teleprompter is very simple. The text content is output through the host. The text is transmitted through the monitor, and then reflected to the beam splitter, so that the function of prompting can be realized. It can be understood from the above-mentioned studio teleprompter structure diagram.

However, this type of teleprompter is not convenient for motion shooting of the camera, and it is necessary to adjust the height of the tripod head. The beam splitter is large and fragile, and is inconvenient to use.

SUMMARY

In order to solve the above problems, the present application provides use of an aerial imaging element in a teleprompter system.

Use of an aerial imaging element in a teleprompter system.

Wherein, the aerial imaging element includes one or more optical elements that bend incident light of an image and form a real image in the air.

The aerial imaging element further includes one or more translucent reflectors.

Preferably, each of the optical elements is a transparent or translucent sphere with a reflective film coated at the bottom (i.e. a translucent bead-arrayed retroreflective screen), or a translucent right angle mirror (i.e. a right angle mirror-arrayed retroreflective screen). An upper part of the right angle mirror is a transparent body and a lower half is a right angle mirror. Wherein, the transparent or translucent sphere is made of glass, and the right angle mirror is made of an acrylic sheet. The transparent sphere or the transparent body has a refractive index of 2.

Preferably, the optical elements are neatly arranged on a horizontal plane.

Preferably, the optical elements are fixed to a substrate by an adhesive layer.

Preferably, the substrate is a cloth.

In addition, the present application further provides a teleprompter that has simple structure and is convenient to use.

A teleprompter includes a host and a display screen, and further includes an aerial imaging element disposed above the display screen, the host and the display screen being connected to each other, and light of text or image displayed on the display screen forming a real image in the air through the aerial imaging element.

Wherein, the aerial imaging element includes one or more optical elements that bend incident light of an image and form a real image in the air.

Wherein, the aerial imaging element further includes one or more translucent reflectors.

Preferably, each of the optical elements is a transparent or translucent sphere with a reflective film coated at the bottom (i.e. a translucent bead-arrayed retroreflective screen), or a translucent right angle mirror (i.e. a right angle mirror-arrayed retroreflective screen). An upper part of the right angle mirror is a transparent body and a lower half is a right angle mirror. Wherein, the transparent or translucent sphere is made of glass, and the right angle mirror is made of an acrylic sheet. The transparent sphere or the transparent body has a refractive index of 2.

Preferably, the optical elements are neatly arranged on a horizontal plane.

Preferably, the optical elements are fixed to a substrate by an adhesive layer. Preferably, the substrate is a cloth.

Preferably, the optical elements are optical imaging devices that are juxtaposed at a certain interval to form a strip-shaped planar light reflecting portion of a first light control panel and a second light control panel inside a transparent plate, the planar light reflecting portion of the first light control panel and the planar light reflecting portion of the second light control panel being oppositely arranged in an intersecting manner (reference of the specific structure of the optical element can be made to Chinese patent application no. 201380053517.0).

Preferably, the aerial imaging element is a DCRA optical element. More preferably, the aerial imaging element is a DCRA optical element formed by combining tiny mirrors of a size of 100 μm (reference of the specific structure of DCRA optical element can be made to Chinese patent application no. 200780010350.4).

A teleprompter device includes a teleprompter having a host and a display screen, further includes an aerial imaging element disposed above the display screen, the host and the display screen being connected to each other, and further includes a camera obscura. The aerial imaging element of the teleprompter is installed at an opening directly above the camera obscura; a display device formed from the host and the display screen of the teleprompter is placed in the camera obscura, and a picture of the display screen in the display device is focused in the air by refraction of the aerial imaging element to form an aerial real image.

Preferably, the display screen of the display device forms an included angle of 0-90° with the aerial imaging element, and most preferably an included angle of 45°.

Preferably, a display screen angle adjustment device may be provided in the camera obscura.

Preferably, the display device is a computer, a notebook or a projector.

Preferably, the camera obscura is provided with a gesture recognition camera for capturing a gesture of a speaker, and the display device is connected with the gesture recognition camera.

Preferably, a bracket is provided under the camera obscura.

The aerial imaging element of the present application is convenient to manufacture and is low in cost; the aerial imaging element enables an image displayed therein to form a real image in the air, which can be seen only at a certain angle (a viewing range of the screen being a plane of observation formed on both sides at an included angle of about 30 degrees from a vertical direction of the screen). The aerial imaging element is applied to the prompt of aspects, such as news broadcasting and lecture giving, which is convenient and does not influence viewing or video recording at the scene.

Figure 12:
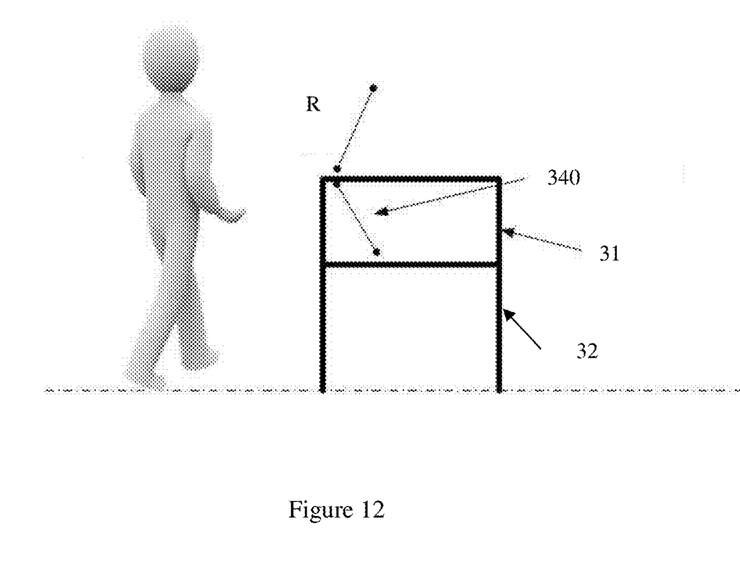
FIG. 12 is a schematic diagram showing use of Example 3 of the present application.
Figure 13:
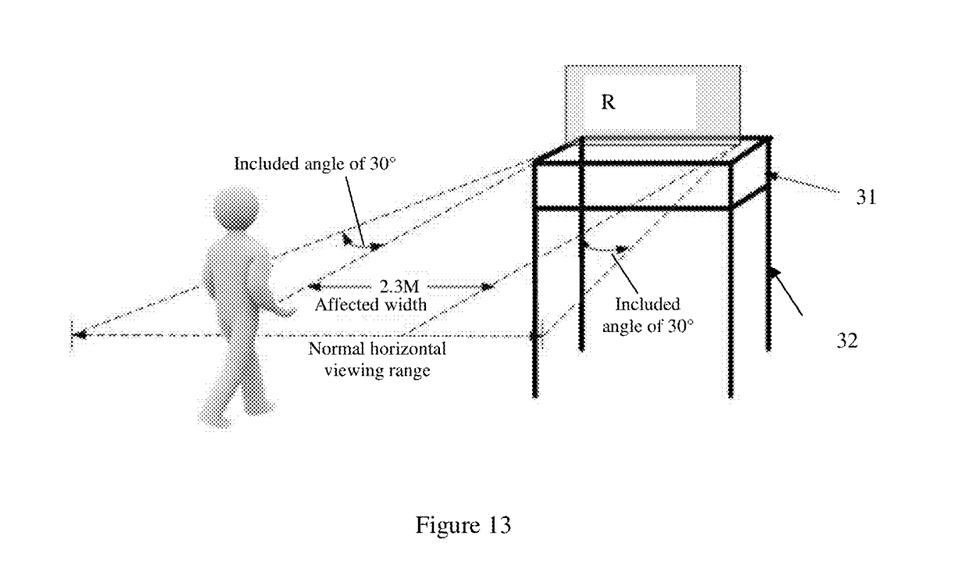
FIG. 13 is a schematic diagram showing the principle of Example 3 of the present application.

A teleprompter device of the present application is similar in appearance to a podium, and includes a camera obscura and a bracket. A nanomaterial glass (an aerial imaging element) is placed at an opening directly above the camera obscura. A display device is placed in the camera obscura. The display device can be, but not limited to, a computer, a notebook or a projector. The display device is connected with a gesture recognition camera. The gesture recognition camera is placed outside the camera obscura to capture gestures and motion of a speaker. A motion recognition device is provided in the display device, which triggers a change of a picture in the display device according to a gesture change captured by the gesture recognition camera. The picture of the display device in the camera obscura is focused in the air by secondary refraction of the nanomaterial glass to form an aerial image. The speech content of the speaker can be displayed as an aerial image. A computer screen is placed in the camera obscura as shown in FIG. 12. The picture of the computer screen and the aerial image are symmetrical along the glass plane. Therefore, the computer screen is placed upside down to form a certain included angle with the glass, e.g. 45 degrees. Nevertheless, aerial imaging can also be achieved at other angles, which will not be limited in the present application. In the present application, a screen adjustment device is also provided in the camera obscura to adjust the computer screen in the camera obscura according to the height and the position of the eyes of a viewer. By adjusting the screen, a tilt angle of the aerial image can be adjusted so as to adjust the speaker's optimal viewing position. The front viewing range of the teleprompter device is shown in FIG. 13. The horizontal plane width of the aerial image is the same as the width of the computer screen in the camera obscura. The viewing range of the screen is a plane of observation formed on both sides at an included angle of about 30 degrees from a vertical direction of the screen.

DETAILED DESCRIPTION

The present application will now be described in detail in conjunction with the specific embodiments.

EXAMPLE 1

As shown in FIGS. 2-5 and 10, a teleprompter includes a host and a display screen. The host is placed under or inside a desk 11 used by a broadcaster. The display screen is located under a desktop 12. The host and the display screen are connected. An aerial imaging element is provided inside the desk 11. The aerial imaging element is disposed above the display screen. Light of text or image displayed on the display screen forms a real image R in the air through the aerial imaging element. The broadcaster can directly see the real image without looking downward.

Figure 4:
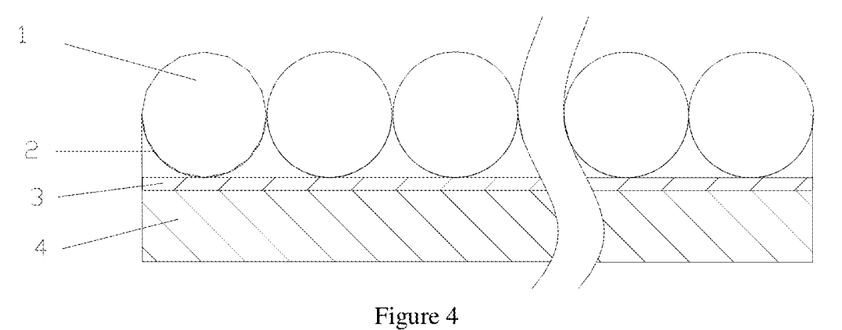
FIG. 4 is a schematic structural diagram of a translucent bead-arrayed retroreflective screen of an aerial imaging element according to Example 1 of the present application.
Figure 5:
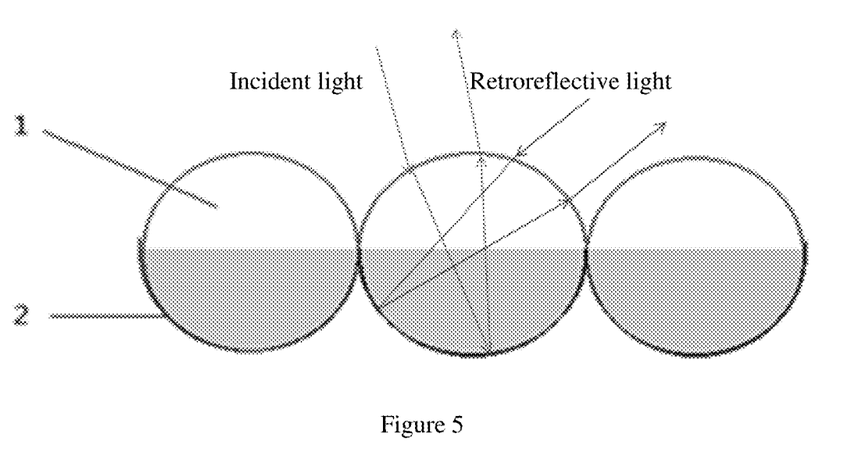
FIG. 5 is a schematic diagram showing the optical principle of an optical element of Example 1 of the present application, a reflection array of translucent beads.
Figure 6:
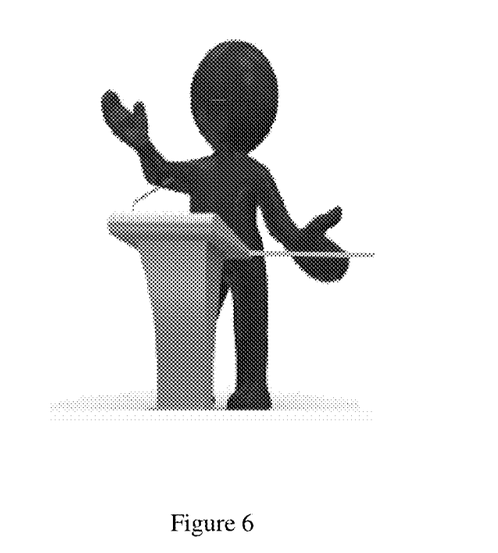
FIG. 6 is a schematic diagram showing use of the Example 2 of the present application in a speech.
Figure 7:
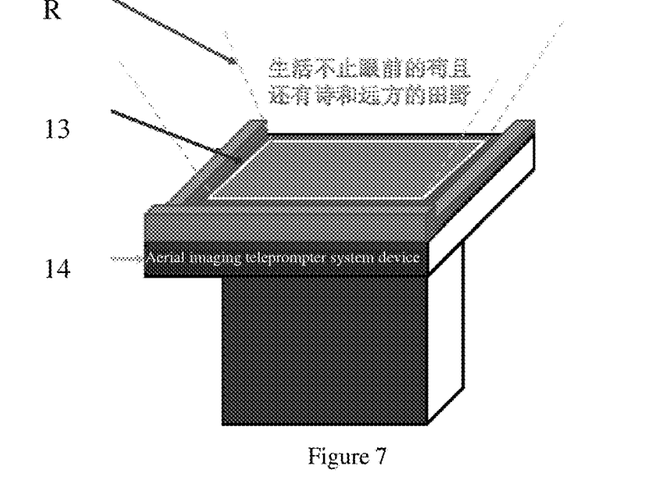
FIG. 7 is a schematic operation diagram of the teleprompter of FIG. 6, wherein R is a real image.

Wherein, as shown in FIGS. 4-5, the aerial imaging element includes one or more optical elements 1 that bend incident light of an image and form a real image in the air, each optical element being a transparent or translucent sphere with a reflective film coated at the bottom, and the transparent or translucent spheres are neatly arranged on a horizontal plane (a reflection array of beads). Light of the image in the display screen is reflected by a reflective film 2 at the bottom of transparent or translucent spheres (the optical elements 1) at least twice, and forms a real image in the air corresponding to the incident image. The transparent spheres 1 (i.e., semi-arc reflecting surfaces 2) have a diameter of less than 1 mm and a refractive index of 2.

Preferably, the aerial imaging element further includes a translucent reflector that reflects a portion of the light of the display screen onto the reflection array of beads comprised of the optical elements 1. And an angle can be adjusted if needed.

The reflection array of beads comprised of the optical elements 1 is fixed onto a cloth 4 by an adhesive layer 3.

Preferably, the teleprompter can perform human-computer interaction by wired or wireless means.

EXAMPLE 2

As shown in FIGS. 6-10, a teleprompter includes a host and a display screen. The host is placed under or inside a podium 14 used by a speaker. The display screen is located under a countertop 13. The host and the display screen are connected. An aerial imaging element is provided inside the podium. The aerial imaging element is disposed above the display screen. Light of text or image displayed on the display screen forms a real image R in the air through the aerial imaging element. The speaker can directly see the real image without looking downward.

Figure 8:
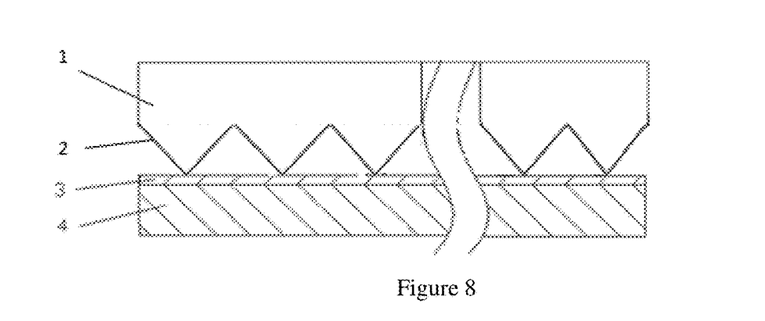
FIG. 8 is a schematic structural diagram of a right angle mirror-arrayed retroreflective screen of an aerial imaging element according to Example 2 of the present application.
Figure 9:
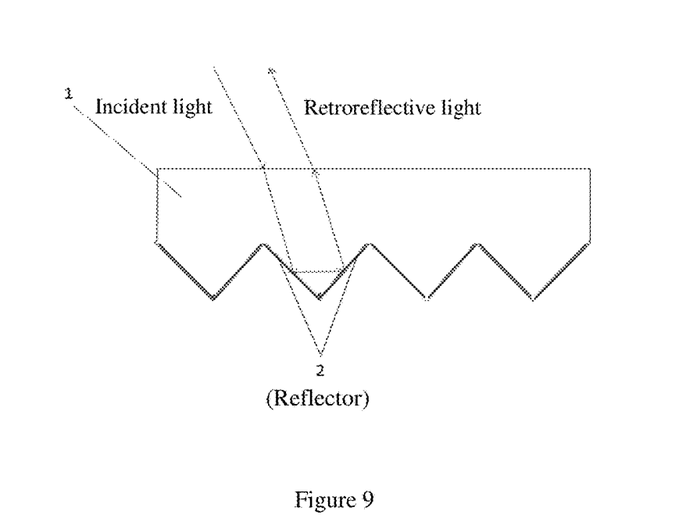
FIG. 9 is a schematic diagram showing the optical principle of an optical element of Example 2 of the present application, an array of right angle mirrors.
Figure 10:
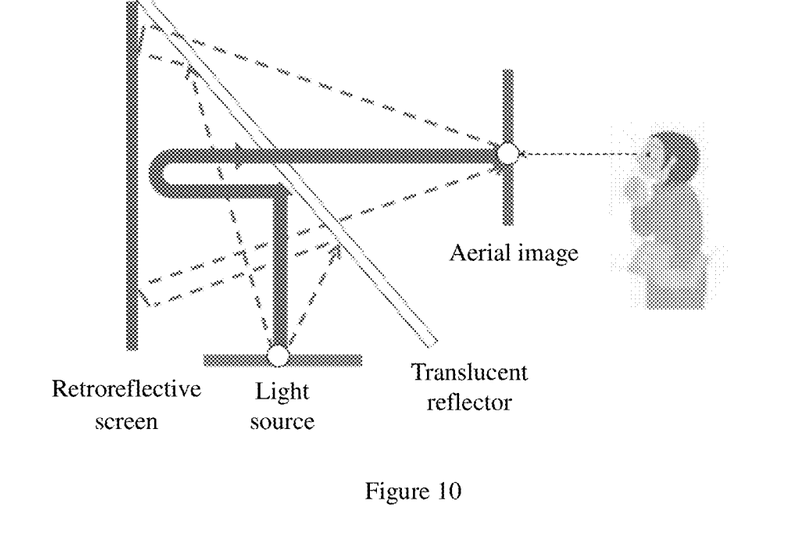
FIG. 10 is a schematic diagram showing the principle of the teleprompters of Examples 1 and 2 of the present application.

Wherein, as shown in FIGS. 8-9, the aerial imaging element includes one or more optical elements 1 that bend incident light of an image and form a real image in the air, each optical element being a translucent right angle mirror, an upper part of the right angle mirror being a transparent body and a lower half being a right angle mirror. Each of the transparent bodies is preferably made of glass, and each of the right angle mirrors is made of an acrylic sheet. The translucent right angle mirrors (optical elements 1) are arranged on a horizontal plane (a reflection array of right angle mirrors). Light of the image in the display screen is reflected by the right angle mirrors to form a real image R in the air corresponding to the incident image.

Preferably, the aerial imaging element further includes a translucent reflector that reflects a portion of the light of the display screen onto the reflection array of right angle mirrors comprised of the optical elements 1. And an angle can be adjusted if needed.

The reflection array of right angle mirrors comprised of optical elements 1 is fixed onto a cloth 4 by an adhesive layer 3.

Preferably, the teleprompter can perform human-computer interaction by wired or wireless means.

EXAMPLE 3

Figure 11:
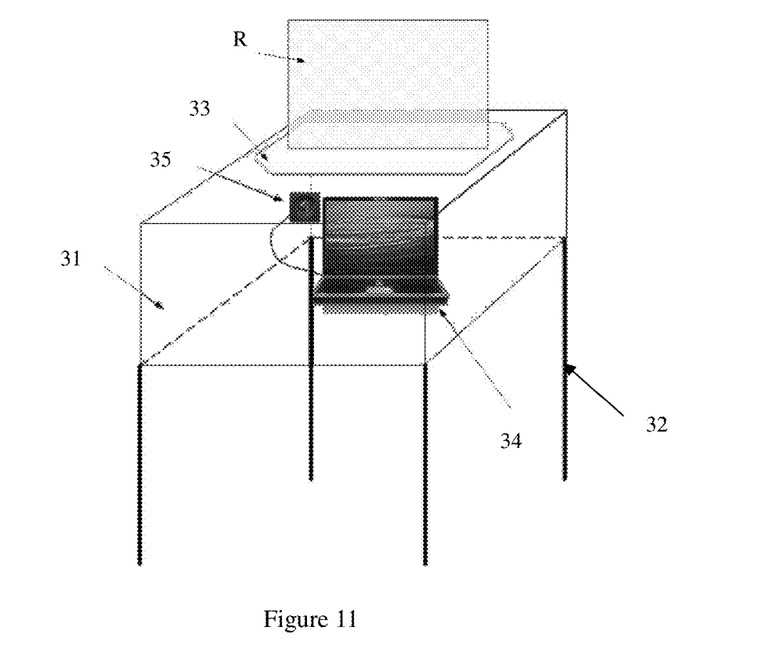
FIG. 11 is a schematic structural diagram of Example 3 of the present application.

As shown in FIGS. 11-13, a teleprompter device includes a camera obscura 31 and a bracket 32. An aerial imaging element 33 is placed at an opening directly above the camera obscura 31. A display device 34 is placed in the camera obscura 31. A picture of the display device 34 is focused in the air by secondary refraction of the aerial imaging element to form a real image R, i.e. the speech content of a speaker displayed as an aerial image. A display screen 340 (e.g. a computer screen) of the display device 34 is placed in the camera obscura 31 as shown in FIG. 12. A picture of the display screen 340 (e.g. computer screen) and the aerial image R are symmetrical along the glass plane (the aerial imaging element 33). Therefore, the display screen 340 (e.g. computer screen) is placed upside down to form a certain included angle with the glass, e.g. 45 degrees. Nevertheless, aerial imaging can also be achieved at other angles, which will not be limited in the present application. In the present application, a screen adjustment device is also provided in the camera obscura 31 to adjust the display screen 340 (e.g. computer screen) in the camera obscura 31 according to the height and the position of the eyes of a viewer. By adjusting the screen, a tilt angle of the aerial image can be adjusted so as to adjust the speaker's optimal viewing position. The front viewing range of the teleprompter device is shown in FIG. 13. The horizontal plane width of the aerial image is the same as the width of the display screen 340 (e.g. computer screen) in the camera obscura 31. The viewing range of the screen is a plane of observation formed on both sides at an included angle of about 30 degrees from a vertical direction of the screen.

Preferably, the display device 34 can be a computer, a notebook or a projector.

The camera obscura 31 is provided with a gesture recognition camera 35 for capturing a gesture of the speaker. The display device 34 is connected with the gesture recognition camera 35. A motion recognition device is provided in the display device 34, which triggers a change of a picture in the display device according to a gesture change captured by the gesture recognition camera 35.

What is claimed is:

1. A teleprompter, comprising a host, a display screen, an aerial imaging element disposed above the display screen, the host and the display screen being connected to each other, the host being configured to provide the display screen with text or image and light of the text or image displayed on the display screen forming a real image in the air through the aerial imaging element;
wherein the aerial imaging element comprises one or more optical elements that bend incident light of an image and form the real image in the air;
wherein the optical elements are optical imaging devices that are juxtaposed at a certain interval to form a strip-shaped planar light reflecting portion of a first light control panel and a second light control panel inside a transparent plate, the planar light reflecting portion of the first light control panel and the planar light reflecting portion of the second light control panel being oppositely arranged in an intersecting manner.

2. The teleprompter of claim 1, wherein the aerial imaging element further comprises one or more translucent reflectors.

3. The teleprompter of claim 1, wherein each of the optical elements is a transparent sphere with a reflective film coated at a bottom thereof.

4. The teleprompter of claim 3, wherein the transparent sphere has a refractive index of 2.

5. The teleprompter of claim 3, wherein the optical elements are neatly arranged on a horizontal plane.

6. The teleprompter of claim 1, wherein each of the optical elements is a transparent body-right angle mirror, an upper part of the right angle mirror being a transparent body and a lower half being a right angle mirror.

7. The teleprompter of claim 6, wherein the transparent body has a refractive index of 2.

8. The teleprompter of claim 6, wherein the optical elements are neatly arranged on a horizontal plane.

9. The teleprompter of claim 1, wherein the aerial imaging element is a diherdral corner reflector array (DCRA) optical element.

10. The teleprompter of claim 9, wherein the DCRA optical element is formed by combining tiny mirrors of a size of 100 μm.

11. A teleprompter device comprising a teleprompter, the teleprompter comprising a host, a display screen, an aerial imaging element disposed above the display screen, the host and the display screen being connected to each other, the host being configured to provide the display screen with text or image and light of the text or image displayed on the display screen forming a real image in the air through the aerial imaging element; wherein the teleprompter device further comprises a camera obscura, the aerial imaging element of the teleprompter being installed at an opening directly above the camera obscura; a display device formed from the host and the display screen of the teleprompter is placed in the camera obscura, and a picture of the display screen in the display device is focused in the air by refraction of the aerial imaging element to form the real image in the air.

12. The teleprompter device of claim 11, wherein the display screen of the display device forms an included angle of 0-90° with the aerial imaging element.

13. The teleprompter device of claim 12, wherein the included angle is 45°.

14. The teleprompter device of claim 11, wherein the display device is a computer, a notebook or a projector.

15. The teleprompter device of claim 11, wherein the camera obscura is provided with a gesture recognition camera for capturing a gesture of a speaker, the display device being connected with the gesture recognition camera, and a motion recognition device is provided in the display device, which triggers a change of a picture in the display device according to a gesture change captured by the gesture recognition camera.

16. The teleprompter device of claim 11, wherein a bracket is provided under the camera obscura.

17. The teleprompter device of claim 11, wherein a screen angle adjustment device is provided in the camera obscura.

* * * * *